UNITED STATES PATENT OFFICE.

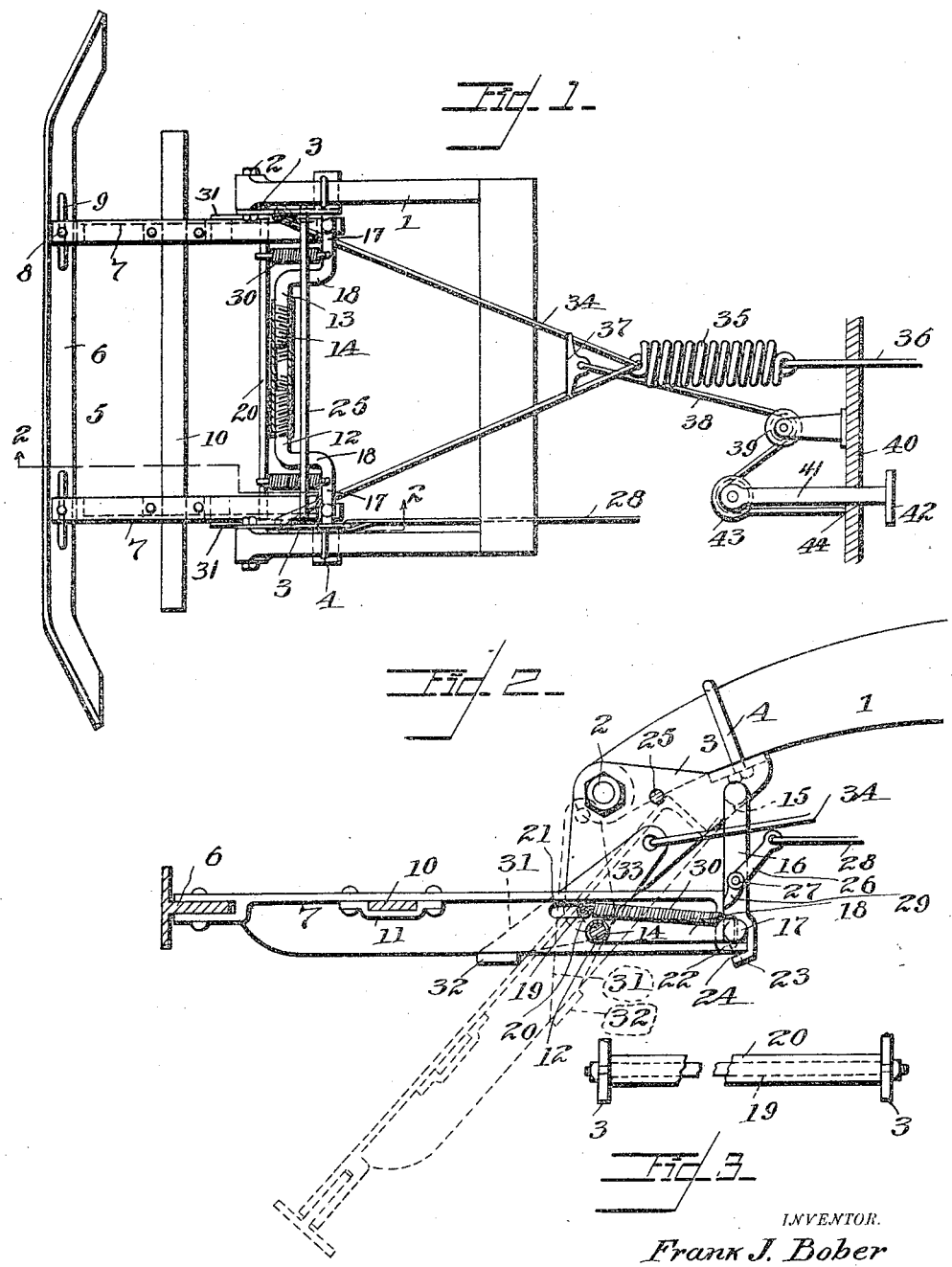

FRANK J. BOBER, OF ST. LOUIS, MISSOURI, ASSIGNOR TO BOBER AUTO PARTS CORPORATION, OF ST. LOUIS, MISSOURI, A CORPORATION.

FENDER.

1,285,002.  Specification of Letters Patent.  Patented Nov. 19, 1918.

Application filed April 13, 1918. Serial No. 228,346.

*To all whom it may concern:*

Be it known that I, FRANK J. BOBER, a citizen of the United States, residing in the city of St. Louis and State of Missouri, have invented new and useful Improvements in Fenders, of which the following is a specification.

This invention relates to a fender for vehicles, and in the present specification it is described as applied to an automobile. The general object of the invention is to produce a simple apparatus for this purpose which can be readily attached to a vehicle such as an automobile and which is so constructed that it is normally held in a raised or inactive position, but when struck by a body in front of the fender it drops automatically to an active position; a feature of the invention lies in the fact that the fender can also be dropped by the driver of the car in case he sees the necessity for its use; another feature of the invention resides in the use of parts which enable the fender to be reset in its normal position from the driver's position.

The invention consists in the general combination of parts and features to be particularly described hereinafter all of which contribute to produce a simple and efficient fender. A preferred embodiment of my invention will be particularly described in the following specification while the broad scope of my invention will be pointed out in the appended claims.

In the drawing:

Figure 1 is a plan indicating the arrangement of the parts when the invention is applied to an automobile or car.

Fig. 2 is a vertical section upon an enlarged scale, taken about on the line 2—2 of Fig. 1, and showing the fender in its inactive position. In dotted lines this view indicates the relation of the parts when the fender is in its active position.

Fig. 3 is a plan indicating the manner of mounting the pivotal support for the fender, the supporting brackets being partially broken away.

Referring more particularly to the parts, 1 represents the forward portions of the side frame bars of the automobile, the forward end of each being attached to the forward springs (not illustrated) by the transverse bolt 2. In applying my invention I utilize the bolts 2 to secure in place a bracket plate 3 at each side, each bracket plate being additionally secured by means of a clip 4 which secures its rear portion to the under side of the frame bar 1. These brackets 3 are for the purpose of supporting a fender 5 comprising a transverse buffer bar or bumper 6, the ends of which are preferably inclined rearwardly (see Fig. 1.) The fender also includes two side bars 7 the forward ends of which are preferably secured to the buffer bar or bumper 6 by means of bolts 8, each bolt lying in an adjusting slot 9. This arrangement renders the device adjustable so that the side bars 7 can be brought nearer together or held further apart to correspond with the distance between the frame bars 7 of the automobile. The fender may also include another cross-bar 10 held by cleats 11 on the side bars 7.

This fender is normally held in a raised inactive position in which the fender is substantially horizontal (see Fig. 2). I provide latching means to engage the fender for normally holding it in this inactive position. The fender is so supported that when it is in its inactive position it can be moved or shifted rearwardly by a body striking the forward end of the fender, and I utilize this rearward movement to effect the release of the fender from the latching means. Associated with the latching means I also provide means for releasing the fender at will from the driver's position.

The latching means preferably is in the form of a transverse latch bar 12 consisting of two end members 13 connected by an extension coupling 14. Each end member 13 comprises an elevated pintle 15 at its end, which is pivotally supported in its corresponding bracket plate 3. Each of these pintles 15 is formed on a substantially vertical extension 16 (see Fig. 2) from which it will be seen that the latch-bar hangs down as a pendulum from the brackets 3. Adjacent each substantially vertical extension or arm 16, the latch-bar presents a substantially horizontal neck or wrist 17, and these necks 17 are connected integrally by forward extensions 18 with the members 13 which are connected together by the aforesaid extension coupling 14. This extension coupling 14 is threaded to the members 13, and enables the length of this latch bar to be adjusted to fit different cars.

The fender is pivotally supported by the brackets, preferably by means of a transverse rod 19 the ends of which are secured in the brackets 3, and around this rod there is placed a tube 20 which operates as a roller when the fender shifts backward. For this purpose the rod 19 and roller 20 pass through slots 21 formed in the side bars 7 of the fender, the rear portion of the fender extending rearwardly beyond this point. (See Fig. 2.) The rear end of the fender engages or interlocks with the latch-bar 12 so that the latch-bar can hold the fender up, in its raised inactive position. For this purpose the rear end of each arm 7 is provided with a rearwardly projecting toe 22, and each neck 17 is formed with a finger 23 which projects forwardly and inclines downwardly so that a rudimentary socket 24 is formed for each of the toes 22. It will be evident from an inspection of Fig. 2 that if a body strikes the forward end of the fender the slots 21 will permit the shifting of the fender rearwardly. This will swing the latch-bar rearwardly on its pintles 15, which will release itself from the fender, and the forward end of the fender will then drop until the fender assumes its active position as indicated in dotted outlines in Fig. 2. This dropping movement of the fender is finally arrested by a cross bar or stop 25 (see Fig. 2) which connects the brackets 3.

In order to enable the fender to be released from the driver's position I provide a tripping device preferably in the form of a lever 26 pivotally mounted at 27 on the transverse latch-bar. To the long arm of this lever 26 a wire or cord 28 is attached, which leads back to the driver's position, and the short arm of the lever is in the form of a dog 29 the nose of which rests against the back end of the corresponding side-bar 7 of the fender. It will be evident that if a pull is exerted upon the wire 28, the dog 29 will exert pressure on the fender. As the fender cannot move forwardly the pressure of the dog 29 will result in swinging the latch bar rearwardly, thereby releasing the fender from the latch-bar, whereupon the fender will drop to its active position. Resilient means is provided for maintaining the latch-bar in engagement with the fender; for this purpose I prefer to provide two springs 30 disposed respectively at each side of the car and connecting the wrists 17 with the aforesaid cross-bar 19.

I provide means for counterbalancing the weight of the fender which facilitates resetting it in its inactive position. I prefer to combine this means with the resetting means. For this purpose at each side of the device I provide a rocking plate 31, each of said rocking plates being pivotally mounted on the cross-bar 19 adjacent its corresponding bracket plate 3. The forward end of each of these rocking plates 31 is formed with a toe 32 which projects under the lower end of its adjacent side bar 7. The rear portion of each rocking plate constitutes a rearwardly extending inclined arm 33 (see Fig. 2), and to each of these arms 33 a cord or wire 34 is attached; these cords converge, the rear ends thereof being secured to the forward end of a stout coil spring 35 (see Fig. 1). The rear end of this spring is connected by a wire or cord 36 with a suitable anchorage on the frame of the car. It should be understood that the strength of this spring is not sufficient to hold the fender up if the fender is released from the latch-bar but it does partially counterbalance the weight of the fender so as to render it easier to reset the fender. In order to reset the fender I provide an equalizer bar 37 that connects the cords 34, and this equalizer bar may be pulled rearwardly by a cord or wire 38 which extends rearwardly and around a pulley 39 mounted forward of the dash 40 of the car. Movably mounted in the dash 40 near the pulley 39 I provide a push-rod or stem 41 having a head 42 to be pressed by the driver's foot. The cord 38 after passing around the pulley 39 passes around another pulley 43 on the forward end of the push-rod or plunger 41, beyond which it is anchored to the dash, as at 44. Evidently if the plunger 41 should be pushed forward, a pull will be exerted on the wire 38 which will be imparted to the wires 34, and this will rock the rocking plates 31 in a clockwise direction. In this movement the toes 32 of the rocking plates will operate to raise the fender.

When the fender is in its active position the springs 30 pull the latch-bar as far forward as possible, this forward movement of the latch-bar is finally arrested by the cross rod or bar 19 which lies in its path, (see Fig. 2), in which it should be noted that the rotation takes place about the elevated pintles 15.

The purpose of the inclined relation of the fingers 23, is to insure a snug contact between the sockets 24 and the toes 22 so as to prevent rattling.

The mode of operation of the fender will now be briefly stated.

If the fender is struck by a body in front of the automobile the fender will be shifted rearwardly on its pivotal supports at 19 and this will rock the latch bar 12 so as to disengage it from the fender and permit the fender to drop to the position in which it is indicated in dotted lines in Fig. 2.

If the driver of the car sees a person in front of it, who is in danger of being run over, he simply pulls the wire 28 which will operate the lever 26, the short arm 29 of which, shoves against the rear end of one of the cross bars 7 of the fender, thereby swinging the latch-bar rearwardly and causing it to disengage the sockets 24 from the toes 22. The fender will then drop to its active position.

In order to reset the fender in its active position it is simply necessary to push on the plunger 41, which exerts tension in the wires 34, thereby swinging the rocking plates 31 on their pivotal support. This operates to swing the fender up to a substantially horizontal position, and when the rear end of the fender has been sufficiently depressed in this way the springs 30 will pull the latch-bar forwardly so as to engage the sockets 24 with the toes 22. As the toes 22 swing down, they engage the forward faces of the extensions 16 and this swings the latch-bar back until the wrists are pulled forward to engage the sockets 24 with the toes.

It will be evident that if the latch-bar is released at one of its wrists 17, the movement will be communicated to the opposite wrist. Hence if a body strikes the fender near one end and slides the fender back on that side only, it will still operate to release the latch-bar and drop the fender.

It is understood that the embodiment of the invention described herein is only one of the many embodiments my invention may take, and I do not wish to be limited in the practice of my invention nor in my claims, to the particular embodiment set forth.

What I claim is:—

1. In apparatus of the class described, the combination of a pivotally supported fender mounted so as to swing up or down at its front, a transverse latch bar constructed to engage the rear end of said fender at both sides of the car for normally holding the same set in a raised inactive position, said latch bar and fender constructed to permit a rearward movement of said fender when in its set position, said latch-bar and the rear end of said fender constructed so as to coöperate during the rearward movement of said fender to release the fender from said latch bar to permit the forward end of said fender to drop and thereby place the fender in its active position.

2. In apparatus of the class described, the combination of a pivotally supported fender mounted so as to swing up or down at its front, a transverse latch bar constructed to engage the rear end of said fender at both sides of the car for normally holding the same set in a raised inactive position, said latch bar and fender constructed to permit a rearward movement of said fender when in its set position, said latch-bar and the rear end of said fender constructed so as to coöperate during the rearward movement of said fender to release the fender from said latch bar to permit the forward end of said fender to drop and thereby place the fender in its active position, and means for releasing said fender from said latch bar operable from the driver's position.

3. In apparatus of the class described, the combination of a pair of brackets to be attached on opposite sides of the vehicle at the front, a fender pivotally supported on said brackets so as to swing up or down at its front, a transverse latch bar pivotally mounted on said brackets so as to hang down and swing in a front and rear direction, said latch bar having sockets at each side of the vehicle to engage the rear end of said fender, and hold the same normally in its set inactive position, said latch bar and said fender constructed to permit a rearward movement of said fender when struck by a body in front of the fender, and thereby swing said latch bar rearwardly and release the fender therefrom, the forward end of said fender operating thereafter to drop and place said fender in its active position.

4. In apparatus of the class described, the combination of a pivotally supported fender mounted so as to swing up or down at its front, a transverse latch bar constructed to engage the rear end of said fender at both sides of the car for normally holding the same set in a raised inactive position, said latch bar and fender constructed to permit a rearward movement of said fender when in its set position, said latch-bar and the rear end of said fender constructed so as to coöperate during the rearward movement of said fender to release the fender from said latch bar to permit the forward end of said fender to drop and thereby place the fender in its active position, and means mounted adjacent said brackets and operable from the driver's position for raising the fender to reset the same.

5. In apparatus of the class described, the combination of a pair of brackets to be attached on opposite sides of the vehicle at the front, a fender pivotally supported on said brackets so as to swing up or down at its front, a transverse latch-bar pivotally supported in said brackets and having a socket near each side of the vehicle for engaging the rear end of the fender to hold the same set in its raised and inactive position, and means mounted on said transverse latch-bar and operable from the driver's position for swinging said latch bar out of engagement with the rear end of said fender to permit the fender to drop at the front and assume its active position.

6. In apparatus of the class described, the combination of a pair of brackets to be attached on opposite sides of the vehicle at the front, a fender pivotally supported on said brackets so as to swing up or down at its front, a transverse latch-bar pivotally mounted on said brackets so as to hang down and swing in a front and rear direction, said latch bar constructed to engage the rear end of said fender at each side so as to hold said fender normally raised in its inactive position, resilient means tending to swing said latch-bar forwardly and maintain the same in engagement with the fender and means associated with said latch-bar and operable from the driver's position for swinging the latch bar rearwardly to release the fender and thereby permit the fender to swing down at the front to assume its active position.

7. In apparatus of the class described, the combination of a pair of brackets to be attached on opposite sides of the vehicle at the front, a fender pivotally supported on said brackets so as to swing up or down at its front, a transverse latch-bar pivotally mounted on said brackets so as to hang down and swing in a front and rear direction, said latch-bar constructed to engage the rear end of said fender at each side so as to hold said fender normally raised in its inactive position, resilient means tending to swing said latch bar forwardly and maintain the same in engagement with the fender, means associated with said latch bar and operable from the driver's position for swinging the latch bar rearwardly to release the fender and thereby permit the fender to swing down at the front to assume its active position, a spring for counterbalancing the weight of the forward portion of the fender, and means for resetting the fender in its inactive position operable from the driver's position.

8. In apparatus of the class described, the combination of a pair of brackets to be attached on opposite sides of the vehicle at the front, a fender having pivotal supports on said brackets enabling said fender to swing up and down at its front and to slide rearwardly on the pivotal supports when the fender is in its raised and inactive position, a transverse latch-bar engaging said fender, for normally holding the same in its raised inactive position, said latch-bar and said fender constructed to coöperate to release the fender from the latch-bar if said fender is moved rearwardly by a body striking the fender while in its set position, resilient means tending to maintain the latch-bar in engagement with the fender when in its set position, and means pivotally mounted and operable from the driver's position, for raising the fender to return it to its set position.

9. In apparatus of the class described, the combination of a pair of brackets to be attached on opposite sides of the vehicle at the front, a fender having pivotal supports on said brackets enabling said fender to swing up and down at its front and to slide rearwardly on the pivotal supports when the fender is in its raised and inactive position, a transverse latch-bar for engaging said fender, for normally holding the same in its raised inactive position, said latch-bar and said fender constructed to coöperate to release the fender from the latch-bar if said fender is moved rearwardly by a body striking the fender while in its set position, resilient means tending to maintain the latch-bar in engagement with the fender when in its set position, means pivotally mounted on said pivotal supports and operable from the driver's position for raising the fender to return it to its set position, and means associated with said latch-bar and operable from the driver's position for releasing the fender from the latch-bar.

10. In apparatus of the class described, the combination of a pivotally supported fender mounted so as to swing up or down at its front, latching means for engaging the rear end of said fender at both sides of the car for normally holding the same set in a raised inactive position, and a lever mounted on said latching means, and operable from the driver's position, and movably engaging said fender for moving said latching means out of engagement with said fender to permit the forward end of said fender to drop and place the fender in its active position.

11. In apparatus of the class described, the combination of a fender, latching means for normally holding the same in an inactive position, said latching means and said fender constructed so as to coöperate when said fender is struck by a body in front of the fender, to release said latching means, and thereby permit said fender to assume an active position, resilient means for substantially counterbalancing the weight of said fender, and means for resetting said fender in its inactive position, actuated from the driver's position.

12. In apparatus of the class described, the combination of a fender, latching means for normally supporting the same in an inactive position, means for actuating said latching means by a rearward movement of the fender to release the fender, means controlled from the driver's position for actuating the latching means to release the fender, said fender constructed to assume an active position when released by said latching means, means for substantially counter-balancing the weight of said fender, and means controlled from the driver's position for resetting the fender in its inactive position.

In testimony whereof, I have hereunto set my hand.

FRANK J. BOBER.